United States Patent
Kousek

[11] Patent Number: 6,082,875
[45] Date of Patent: Jul. 4, 2000

[54] CONSTRUCTIONAL LASER

[75] Inventor: Heinz Kousek, Feldkirch, Austria

[73] Assignee: Hilti Aktiengesellschaft, Schaan, Liechtenstein

[21] Appl. No.: 09/219,537

[22] Filed: Dec. 22, 1998

[30] Foreign Application Priority Data

Dec. 23, 1997 [DE] Germany ............... 197 57 532

[51] Int. Cl.$^7$ .................................................. F21K 7/00
[52] U.S. Cl. ............................... 362/259; 33/291; 362/35
[58] Field of Search .......................... 33/291; 356/247; 362/35, 259, 269, 270, 287, 288

[56] References Cited

U.S. PATENT DOCUMENTS

| 4,973,158 | 11/1990 | Marsh | 33/291 |
| 5,690,418 | 11/1997 | Hsiung | 362/259 |
| 5,742,387 | 4/1998 | Ammann | 356/247 |

FOREIGN PATENT DOCUMENTS

| 0559489 | 5/1993 | European Pat. Off. . |
| 2200474 | 1/1988 | United Kingdom . |

*Primary Examiner*—Stephen Husar
*Attorney, Agent, or Firm*—Brown & Wood, LLP

[57] ABSTRACT

A constructional laser having a light source (5) for emitting a laser beam (L) arranged in housing (2) and rotatable about a rotational axis (A), a motor-driven shaft (14) supported in the housing (2) for rotation about the rotational axis (A) and having an end projecting into a casing (3) at least partially projecting above the housing (2) and having at least one beam hole (7, 8), with the shaft (4) being rotationally connected with the casing (3), and a direction-changing device (9) for the laser beam (L) and supported on the end of the shaft (4) projecting into the casing (3), with the casing (3) having a peripheral wall (33) spaced from the direction-changing device (9) and with the casing being capable of a limited displacement relative to the housing (2), without any contact between the peripheral wall (33) and the direction-changing device (9).

6 Claims, 2 Drawing Sheets

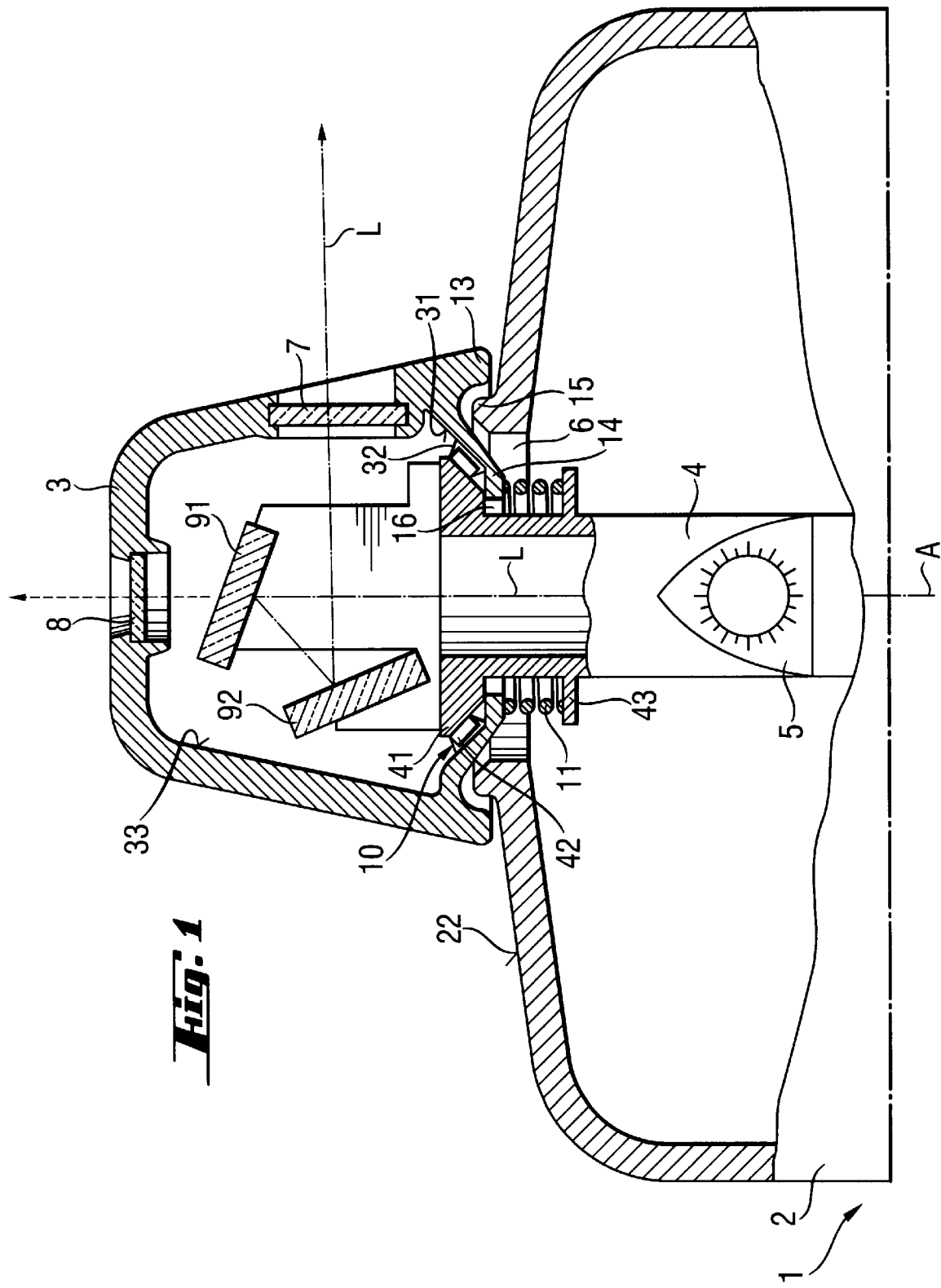

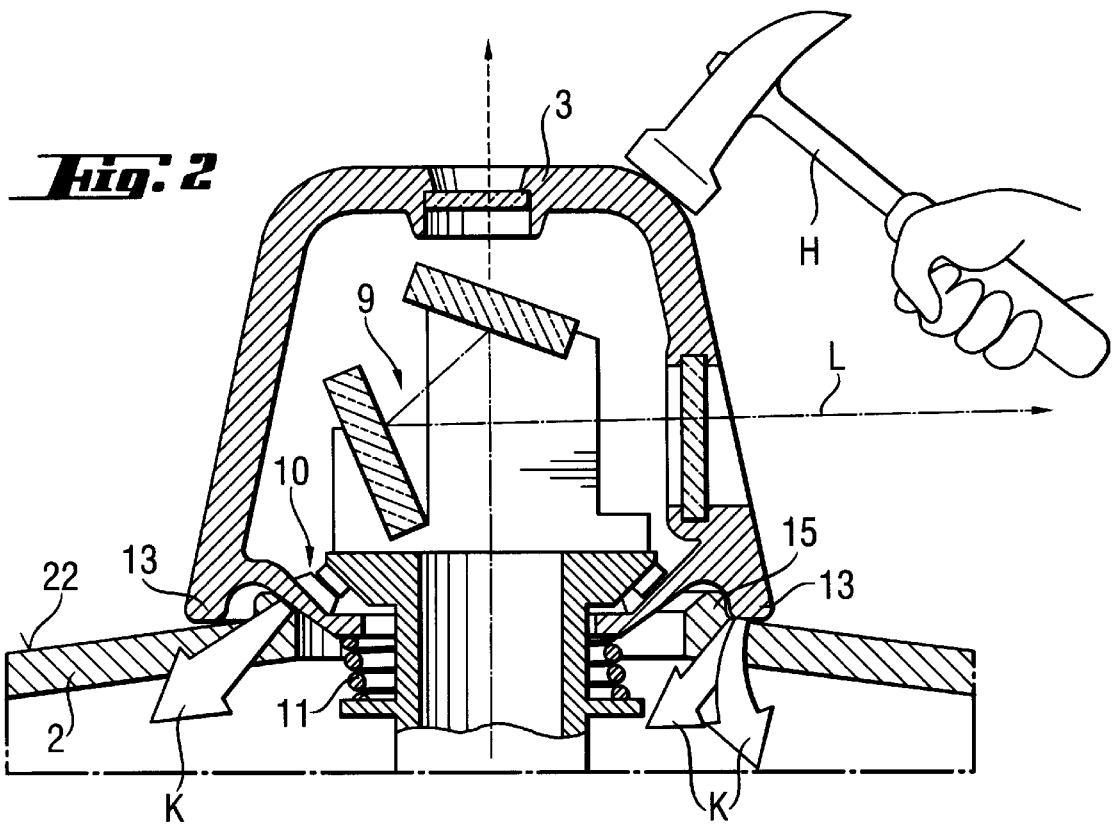
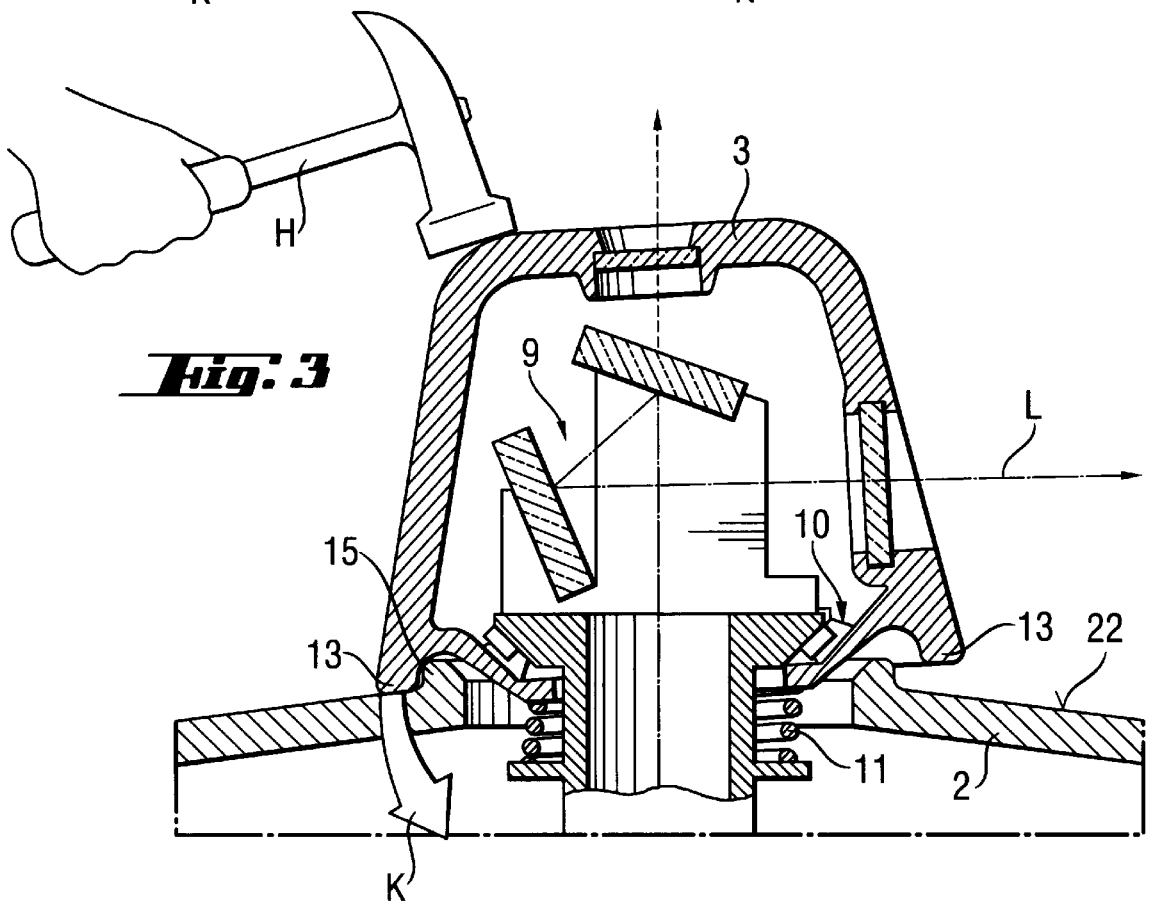

CONSTRUCTIONAL LASER

BACKGROUND OF THE INVENTION

1. Field of the Invention

The present invention relates to a constructional laser including a housing, a casing supported on the housing and having at least one beam hole, a motor-driven shaft supported in the housing for rotation about a rotational axis and having an end projecting into the casing, an arrangement for providing rotation-imparting connection between the shaft and the casing, a light source for emitting a laser beam and supported in the housing for rotation about the rotational axis, and a direction-changing device for the laser beam.

2. Description of the Prior Art

Constructional lasers with a rotatable laser beam, further just lasers, are used in the construction industry, in intallation, electrical and the like jobs as auxiliary means for laying down horizontal and vertical lines on ceilings, walls and floors or to exactly define horizontal and vertical planes in a certain area. This is particularly necessary for straightening of door cases and windows and for determining an exact horizontal course of conduits. The lasers are also used straightening of door cases and windows and for determining an exact horizontal course of conduits. The lasers are also used as auxiliary marking means for a horizontal and vertical alignment of attachment points.

The lasers of this type includes a laser light source which is arranged in the laser housing and the emitted laser beam of which is rotated about a rotational axis. The emitted laser beam is pivoted, at least partially, by 90° with respect to the rotational axis by a direction-changing device and describes thus, during its rotation, a plane. The laser beam is aligned with respect to a constructional component with a leveling device, whereby an exact horizontal position and an exact vertical position of planes, which are defined by the rotatable laser beam, are insured. The leveling devices can be formed as manually adjustable devices. However, they can include an automatically adjustable servo component equipped with a servo-motor. To simplify the straightening of the laser beam or its rotational axis, display devices are provided on the laser housing which display a relative position of the rotational axis in the housing. The direction-changing device for pivoting or deflecting the laser beam, which is emitted by the laser light source, includes a mirror arrangement or a deviating prism, preferably, a pentaprism. The rotation of the laser beam is effected, e.g., by rotating the direction-changing device.

In one type of conventional lasers, the deflected laser beam exits through an arrangement of beam holes. The beam hole arrangement is so selected that they insure passing of the rotatable laser beam in all directions without any obstacles to a most possible extent. The beam holes should be formed of plane-parallel glass section having a high optical quality so that the passing laser beam is not deflected from the plane by refraction. The panes are usually formed as polygons and form a lantern-like member which is fixedly connected with the upper wall of the laser housing. The abutting edges of the panes are optically sealed to prevent damaging reflection. The sealing is preferably effected by stiffening of the lantern-like members. The stiffening should insure that the lantern-like member projects, without any damage, above the upper hall of the laser housing in case of its possible inclination. In view of the desired stiffness of the lantern-like member, a relatively large width of the lands is desirable in locations of the joints. On the other hand, the lands should not shade a too large region of the rotatable laser beam. The satisfaction of all of these contradictory requirements increases the manufacturing costs of the lantern-like pane members. In particular, the need in panes with a high optical quality for all of the beam holes and their exact arrangement substantially increases the manufacturing costs. The beam holes should be kept free from any soiling or dirt accumulation to prevent shading of the laser beam and to insure that soiling or dirt would not serve as scattering centers capable of deflecting the laser beam of a set plane. In addition, because of the required stiffness, the lantern-like pane members have a relatively large weight.

In another type of lasers with a rotatable laser beam, the direction-changing device is arranged in a rotatable casing projecting above the upper wall of the housing. The casing either partially or completely is arranged outside of the housing. A beam hole, which is formed in the side wall of the casing, provides for exit of the perpendicularly deflected laser beam component. For rotating the laser beam, the casing is rotated about its rotational axis. The transmission of a rotary movement to the casing is effected with motor-driven shaft axially extending in the laser housing, with the laser light source and other optical components being arranged inside the shaft which is made hollow. The shaft is connected with the casing by appropriate rotation-transmitting means. For purposes of economy of the power supply, which is usually provided by batteries, soft-running shaft bearings and a small-torque drive motor are used. This type of a laser, in comparison with a laser with lantern-like pane members, has a simpler construction and is cheaper in manufacturing. It has a separate, relatively small beam hole, which is closed with an optical glass and rotates together with the casing. The laser beam is not shaded by any stiffening. The possibly necessary cleaning of the beam hole can be effected relatively easy. However, this laser can be relatively easy damaged when subjected to mechanical loads. If the casing, which projects above the housing, is inclined, an impact applied to the casing is transmitted directly to the shaft. This may result in the damage of the soft running shaft bearings. With regard to the optical quality of the laser beam, a small beam cross-section requires relatively large distances. This requires the use of a precisely adjustable optical system. An impact can cause displacement of the optical components inside the shaft and distortion of their precise adjustment, which adversely affect the optical quality of the laser beam.

Accordingly, an object of the present invention is a constructional laser which is insensitive to mechanical loads to a most possible extent. Another object of the present invention is a constructional laser the beam optical quality of which is retained in case of inadvertent inclination of the apparatus. A further object of the present invention is a laser which is simple and cost-effective in manufacturing.

SUMMARY OF THE INVENTION

These and other objects of the present invention, which will become apparent hereinafter, are achieved by providing a constructional laser including a housing and a light source for emitting a laser beam arranged in the housing and rotatable about a rotational axis. Inside the housing, there is arranged a motor-driven shaft rotatable about its axis and rotationally connected with a casing which at least partially projects above the housing and has at least one beam hole. A direction-changing device for the laser beam, which is emitted by the light source, is arranged in the casing and is secured on an extension of the shaft. The casing is secured to the housing with a possibility of a limited axial and radial displacement. The peripheral wall of the casing is spaced from the direction-changing device.

Because the direction-changing device is directly secured to the shaft and has no contact with the casing, there is provided a pre-condition for a such arrangement of the casing that it remains connected with the shaft in rotation-imparting relationship without transmitting impacts to the shaft. In this way, the impacts are prevented from acting on the shaft, whereby the possibility of a damage of the apparatus is reduced, the shaft bearings and optical components remain protected from damage, and the adjustment of the optical components is not distorted. At the same time, the laser is simple and cost-effective in manufacturing. Advantageously, the casing is axially spaced from the housing under normal operational conditions. This insures that the casing can be more easily displaced in the radial direction because the friction forces or any other obstacles, which can result form the casing abutting the housing, are eliminated.

In an advantageous embodiment of the inventive laser, entrained elements are provided on both the shaft and the casing. The entrained elements of the shaft and the casing engage each other under normal operational conditions of the laser and become at least partially disengaged upon an impact action applied to the casing. This prevents the transmission of an impact to the shaft by the rotation-imparting connecting means. Further, the foregoing measures insure that in case of blocking of the casing, the load on the drive motor is reduced. A constructively simple but effective rotation-imparting connection means with entrained elements is obtained when the entrained element, which is associated with the shaft is formed as a bevel gear supported on a shaft circumference, and an entrained element associated with the casing has a toothing engageable with the toothing of the bevel gear and is formed on an inner surface of a conically-shaped bottom of the casing. The conically-shaped bottom projects into an opening of the housing through which the shaft extends into the casing, and has an opening through which the shaft extends. A compression spring biases the bottom of the casing toward the bevel gear. The compression spring is supported on an annular collar provided on the shaft and has a spring excursion which is greater than an axial distance between the casing and the housing.

The prestress insures an engagement of both entrained elements under normal operational conditions. In case of an impact applied to the casing, the entrained elements at least partially separate from each other against the reset force of the spring, with the shaft-side entrained element being displaceable toward the housing and transmitting the impact force to the robust housing. Because the excursion of the spring is greater than the axial distance between the casing and the housing, it is insured that the spring simply dampens the impact. Because the casing abuts the housing before the spring is completely compressed, no impact force is transmitted to the shaft. The casing bottom simply submerges deeper into the opening formed in the upper wall of the housing, which results in disengagement of the entrained elements. The shaft is loaded only by the spring force and not by the impact-generated force.

Advantageously, the casing is provided with an abutment lug which projects from the bottom and forms an extension of the peripheral wall of the casing. The abutment is lug engageable with a circumferential shoulder defining an edge of the opening of the housing. A radial distance between the abutment lug and the shoulder is smaller than a radial distance between a wall of the opening in the bottom of the casing and the shaft under normal operational condition of the laser. The foregoing means takes into account that impacts can act not only in the axial direction, and also takes into account the possibility of impacts causing a relatively large sidewise loading of the casing. The cooperating lug and shoulder limit the radial displacement of the casing. The radial spacing between the casing and the housing insures that the shaft would not be subjected to a side impact imparted by the wall of the opening in the casing bottom.

The arrangement of the light source inside the shaft is so effected that the emission direction of the laser beam inside the housing coincides with the rotational axis of the shaft. The coincidence of the emission direction of the laser beam and the shaft rotational axis permits to simplify the design and to reduce the costs of the direction-changing device. Advantageously, the direction-changing device is formed as a pentaprisma.

BRIEF DESCRIPTION OF THE DRAWINGS

The features and objects of the present invention will become more apparent, and the invention itself will be best understood from the following detailed description for the preferred embodiment when read with reference to the accompanying drawings, wherein:

FIG. 1 shows a partial cross-sectional view of a casing secured to a housing of a constructional laser according to the present invention;

FIG. 2 shows a partial cross-sectional view similar to that of FIG. 1, with the casing being subjected to a hammer blow applied to the right portion of the casing from above; and FIG. 3 shows the same view as FIG. 2 but with a hammer blow being applied to the left portion of the casing from above.

DETAILED DESCRIPTION OF THE PREFERRED EMBODIMENT

FIG. 1 shows an upper portion of a laser 1 according to the present invention. The laser 1 includes a cupola-like casing 3 which is secured to an apparatus housing 2, and a motor-driven hollow shaft 4 supported in the housing 2 for rotation about its axis A. Inside the shaft 4, there is arranged a light source 5 for producing a laser beam L. The light source 5 is so arranged in the shaft 4 that the emission direction of the laser beam L coincides with the rotational axis A of the shaft 4. The shaft 4 projects through an opening 6 formed in an upper wall 22 of the housing 2. An end of the shaft 4, which projects from the housing 2, is connected with a bevel gear 41 provided with a toothing 42. A direction-changing device 9, which is represented by tilted mirrors 91 and 92, is mounted on the bevel gear 41. The direction-changing device 9 pivots the laser beam L, which is emitted by the light source 5 in the direction of the axis A, by 90°. The tilted mirror 91, which is arranged on the axis A, is semipermeable and splits the laser beam L, which is emitted by the light source 5, in two mutually perpendicular components.

The opening 6, which is formed in the upper wall 22 of the housing 2, is covered by the cupola-like casing 3. The direction-changing device 9 is received within the casing 3 without any contact between the inner wall 33 of the casing 3 and the direction-changing device 9. Beam holes 7 and 8 provide for passing of the deflected component, respectively. The first beam hole 7 is formed in the side wall of the casing 3. The second beam hole 8 is offset by 90° with respect to the first beam hole 7 and is provided in the end wall of the casing 3 on an extension of the rotational axis A of the shaft 4. The casing 3 has a bottom 14 which projects into the opening 6 in the upper wall 22 of the housing 2 and has an opening 16 through which the shaft 4 projects. An inner side of the bottom 14 is provided with an annular toothing 32 which, under normal operational conditions, meshes with the toothing 42 of the level gear 41. To insure the meshing of the toothing 32 with the toothing 42, a spring 11 biases the bottom 14 of the casing 3 toward the bevel gear 41. The spring 11 is supported on a collar 43 provided on the shaft 4.

As shown in FIG. 1, under normal operational conditions of the laser 1, the casing 3 is axially spaced from the upper wall 22 of the housing 2. The axial distance between the casing 3 and the upper wall 22 is smaller than the spring excursion of the compression spring 11. An annular support lug 13, which projects from the bottom 14 of the casing 3, forms and extension of the side wall of the casing 3. The support lug 13 is engageable with a circumferential shoulder 15 which defines the edge of the opening 6. Under normal operational condition of the laser 1, the radial distance between the lug 13 and the shoulder 15 is smaller than the distance between the wall of the opening 16 in the bottom 14 of the casing 3 and the shaft 4.

FIGS. 2 and 3 show two positions of the casing 3, in which it is subjected to axial impacts, for illustrating impact coupling between the casing 3 and the shaft 4. The hammer H symbolizes a respective mechanical action. In FIG. 2, the impact is applied to the right side of the casing 3 from above. The impact action causes the displacement of the casing 3 both in axial and radial directions. The displacement of the casing 3 axially results in compression of the spring 11. Before the spring 11 is completely compressed, the lug 13, which projects from the bottom 14 of the casing 3, engages the upper wall 22 of the housing 2. Thereby, the generated impact forces are transmitted to the housing 2, as shown with arrows K. The axial displacement of the casing 3 results at least in a regionwise disengagement of the rotation-impacting arrangement 10. The impact action H also has a side, directed leftwards, component which causes a radial displacement of the casing 3. The radial displacement of the casing 3 is limited by the should 15 which is engaged by the lug 13. The engagement takes place before the wall of the opening 16 in the bottom 14 of the casing 3 impacts the shaft 4.

FIG. 3 illustrates a case of the impact damping when the impacts are applied to the right side of the casing 3 from above. Again, in this case also, the axial and radial displacements of the casing 3 are limited. As in the case illustrated in FIG. 2, the impact forces, which are generated as a result of the impact action H, are transmitted to the housing 2, as indicated with the arrow k, by cooperation of the lug 13 with the upper wall 22 of the housing 2 and with the shoulder 15. Again, as in the case illustrated in FIG. 2, as a result of the compression of the spring 11, a regionwise disengagement of the rotation-imparting arrangement 10 takes place, as shown on the left side of the shaft 4 in FIG. 3.

Thus, the manner in which a casing, in which the direction-changing device is located, is secured to the housing of the laser, effectively prevents the impact forces, which may be imparted to the casing, from acting on a rotational shaft supported in the housing. The impact forces are dissipated by the housing so that the shaft is subjected to smaller spring forces applied by a spring supported on the shaft. This effectively prevents the shaft-supporting bearings and/or the optical components, which are arranged inside the shaft, from being damaged.

Though the present invention was shown and described with references to the preferred embodiment, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A constructional laser, comprising a housing (2); a casing (3) supported on the housing (20) with a possibility of displacement relative thereto in axial and radial directions and having at least one beam hole (7, 8); a motor-driven shaft (4) supported in the housing (2) for rotation about a rotational axis (A) and having an end projecting into the casing (3); means (10) for providing rotation-imparting connection between the shaft (4) and the casing (3); a light source (5) for emitting a laser beam (6) and supported in the housing (2) for rotation about the rotational axis (A); a direction-changing device (9) for the laser beam (L) and supported on the end of the shaft (4) projecting into the casing (3), the casing (3) having a peripheral wall (33) spaced from the direction-changing device (9); and means for limiting the displacement of the casing (3) relative to the housing (2) in the axial and radial directions, whereby any contact between the peripheral, wall (33) of the casing and the direction-changing device is prevented.

2. A constructional laser according to claim 1, wherein the casing (3) is axially spaced from the housing (2) under normal operational conditions of the laser.

3. A constructional laser according to claim 1, wherein the rotation-imparting connection providing means comprises entrained elements on both the shaft (4) and the casing (3) which are engageable with each other under normal operational conditions of the laser and become at least partially disengaged upon an impact action applied to the casing (3).

4. A constructional laser according to claim 3, wherein an entrained element associated with the shaft (4) comprises a bevel gear (41) supported on a circumference of the shaft (4) and having a toothing (42), wherein an entrained element associated with the casing (3) comprises a toothing (32) engageable with the toothing (42) of the bevel gear (42), the toothing (32) being formed on an inner surface (31) of a conically-shaped bottom (14) of the casing (3), the conically-shaped bottom (14) projecting into an opening (6) of the housing (2), through which the shaft (4) extends into the casing (3), and having an opening (16) through which the shaft (4) extends; and wherein the laser further comprises a compression spring (11) for biasing the bottom (14) of the casing (3) toward the bevel gear (41), the compression spring (14) being supported on an annular collar (43) provided on the shaft (4), and the compression spring (11) having a spring excursion which is greater than an axial distance between the casing (3) and the housing (2).

5. A constructional laser according to claim 4, wherein the casing (3) has an abutment lug (13) which projects from the bottom (14) and forms an extension of the peripheral wall (33) of the casing (3), the abutment lug 13 being engageable with a circumferential shoulder (15) defining an edge of the opening (6) of the housing (2), and wherein a radial distance between the abutment lug (13) and the shoulder (15) is smaller than a radial distance between a wall of the opening (16) in the bottom (14) of the casing (3) and the shaft (4) under normal operational condition of the laser.

6. A constructional laser according to claim 1, wherein the shaft (4) is formed as a hollow shaft, and wherein the light source (5) is arranged inside the shaft (94) so that an emission direction of the laser beam coincides with the rotational axis (A) of the shaft (4).

* * * * *